United States Patent
Curry

(10) Patent No.: US 6,483,942 B1
(45) Date of Patent: Nov. 19, 2002

(54) MICRO REGION COUNT IMAGE TEXTURE CHARACTERIZATION

(75) Inventor: Donald J. Curry, Menlo Park, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/406,472

(22) Filed: Sep. 27, 1999

(51) Int. Cl.[7] .............. G06K 9/34; G06K 9/46; G06K 1/00; H04N 1/46; H04N 1/405
(52) U.S. Cl. .......... 382/194; 382/180; 382/204; 358/1.9; 358/3.06; 358/534
(58) Field of Search ................. 382/190, 192, 382/194, 195, 203, 205, 171, 176, 177, 245, 204, 180, 186, 187; 358/1.8, 1.9, 3.06, 534

(56) References Cited

U.S. PATENT DOCUMENTS

| 4,183,013 A | * | 1/1980 | Agrawala et al. ........... 377/10 |
| 4,189,711 A | * | 2/1980 | Frank ........................ 382/180 |
| 4,791,676 A | * | 12/1988 | Flickner et al. ........... 382/204 |
| 4,856,074 A | * | 8/1989 | Nagaoka ..................... 382/180 |
| 5,199,083 A | * | 3/1993 | Takeda ....................... 382/180 |
| 5,717,784 A | * | 2/1998 | Yanagishita et al. ....... 382/176 |

* cited by examiner

Primary Examiner—Joseph Mancuso
Assistant Examiner—Mehrdad Dastouri

(57) ABSTRACT

A method of estimating the dot frequency of an area of a band of an image. The band is divided into small areas, and within each area, each column is processed, pixel by pixel. If a pixel is encountered that is not of the same type as a neighbor, it is assigned a new identification. If a current pixel is the same as the one above or to the left, it is given the same identification. If the pixel is the same as the one above and to the left, the two identifications are merged. At the end of each column two numbers are calculated, one is the number of separate identifications there are in the column, the other is the number of identifications that are in use since the beginning of the entire image. For each area, the dot frequency is the number of separate identifications in the first column plus the number of identifications used in the image up to the last column minus the number of identifications in use at the end of the first column of the band. During the processing of a band the area is moved one pixel to the right and process is repeated. At the end of each band the area is moved one pixel down and the process starts again at the beginning of the image.

1 Claim, 5 Drawing Sheets

MICRO REGION COUNT IMAGE TEXTURE CHARACTERIZATION

BACKGROUND OF THE INVENTION

A method of estimating the halftone dot frequencies in a band of an image by using a sliding window to segment the band into small areas, and keeping a running sum of the number of dots within the areas to calculate the dot frequency.

In order to perform various image processing functions such as segmentation, descreening, testing for halftone vs text, etc, it is often necessary to form a localized measure of image texture or dot frequency.

In a gray halftoned image the dots can simply be counted, but in shadows the dots are connected. A relatively simple texture function is described in FIG. 1 which will produce a value which is related to the total length of edges visible in a given region. These images were created by thresholding the L channel of Lab images of color and black and white halftoned regions. The lower images are small 15×15 windows cut from the centers of the upper images. Measurements of the texture using a previous method, which basically measures the total length of visible edges, results in very different values even though both are halftoned at 85 DPI.

Although valuable in general, this function produces different values when different gray levels are rendered at the same halftone frequency or halftoning is done in color rather than black and white. Other methods of estimating halftone frequencies such as collecting min/max separation lengths suffer from being less localized and relying on methods of finding peaks in histograms which can be difficult. A method that can run at high speeds and can be easily implemented is needed.

SUMMARY OF THE INVENTION

This method iteratively selects bands that can be the width of the image in the fast scan direction, but are a small number of scans in the process direction; for example, five scan lines. A window, 5 by 5 pixels in this example, can be positioned at the beginning of the band to define the first area, and the pixels in each column of the region are then processed iteratively. First the type of the current pixel is determined. Types frequently would be black or white, but any other attribute of the pixels could be used. If the current pixel is not the same type as the one above or to the left, it is assigned a new identification number. If it is the same as the one above or to the left it is assigned the same identification. If it is the same as the one above and to the left, the two original identifications are merged and one identification is used for all three. At the end of each column two numbers are determined. One is the number of separate identification numbers there are in the column. The other is the number of identifications that are in use in the entire image up to that column, which is the number of new identifications issued minus the number of merges.

Finally, to determine a value that is a function of the texture or dot frequency in the current area of the band bounded by the first and last column within the window, the process adds the number of identifications that were used in the left column of the area plus the number of identifications that are in use in the entire band up to the right column of the area minus the number of identifications that were used in the entire image up to the left column of the area. The resultant output is a number which is a function of the dot frequency of the area enclosed in the window and is associated with the central pixel of the area.

The window is then advanced one pixel to the right, the last column is again processed, and a new dot frequency is calculated and output as the value of the next central pixel of the window. The process is repeated until the right edge of the band is reached. The window is then reset to the left edge of the image and lowered by one pixel, and the next line of output pixels is produced. The total process therefore produces an output image having one output dot frequency pixel for each image input pixel. For 600 by 600 pixels and 85 halftone dots per inch, a typical patch is 15 by 15 pixels. A larger patch will be needed to measure a lower halftone frequency. This algorithm produces a good approximation of the dot frequency of an image and can be implemented easily in hardware.

DETAILED DESCRIPTION OF THE INVENTION

Figure 2:
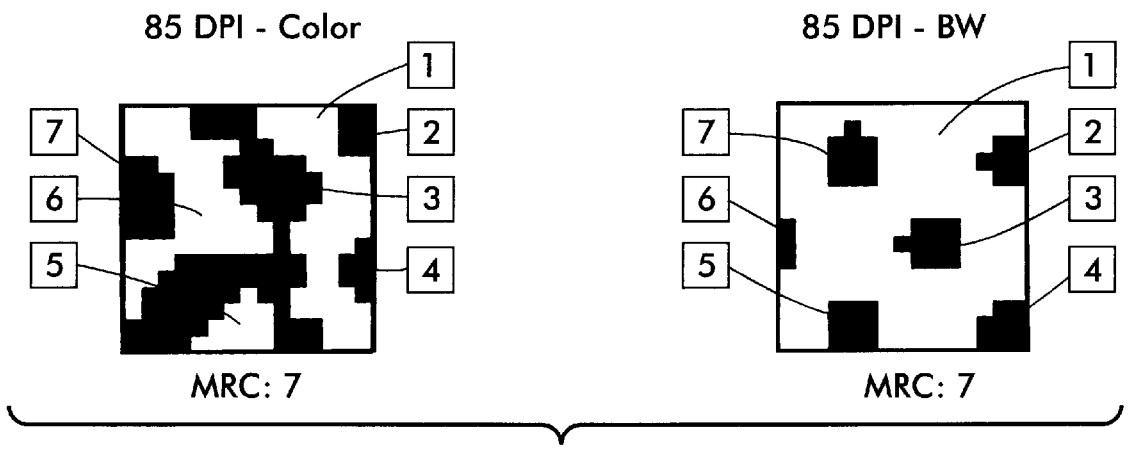
FIG. 2 shows that different dot patterns can result in the same texture frequency when using this method.

The micro region count method, MRC, described here is simply a count of the separate regions (dots) in some window of interest, see FIG. 2. The method assumes that the image has been preprocessed such that each pixel has been assigned a type. For the purposes of our description, we assume that there are only 2 types and they are encoded 0 and 1. For use in characterization of halftones, this means the image has been converted to binary using an effective adaptive thresholding method. Since the basic algorithm is only concerned with counting regions made up of pixels of the same type, the total number of possible types is not relevant and could be greater than 2 for other applications.

Figure 1:
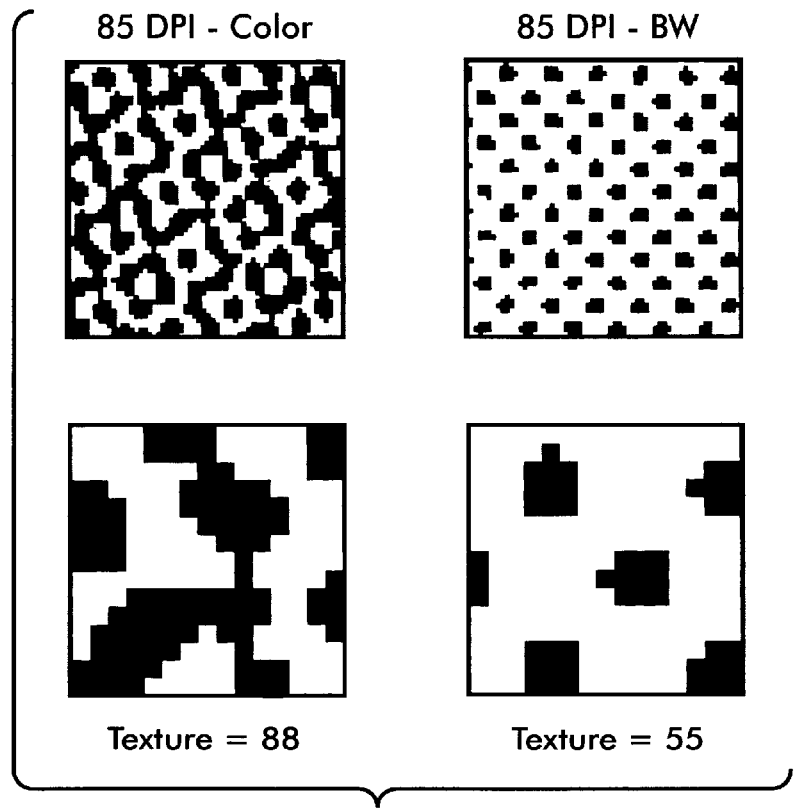
FIG. 1 describes one prior art method of estimating texture frequency.

FIG. 2 demonstrates how this MRC produces the same value (7) for the images of FIG. 1. The MRC texture also does a good job on text and graphics since most information features are well connected and have low region counts.

Figure 3:
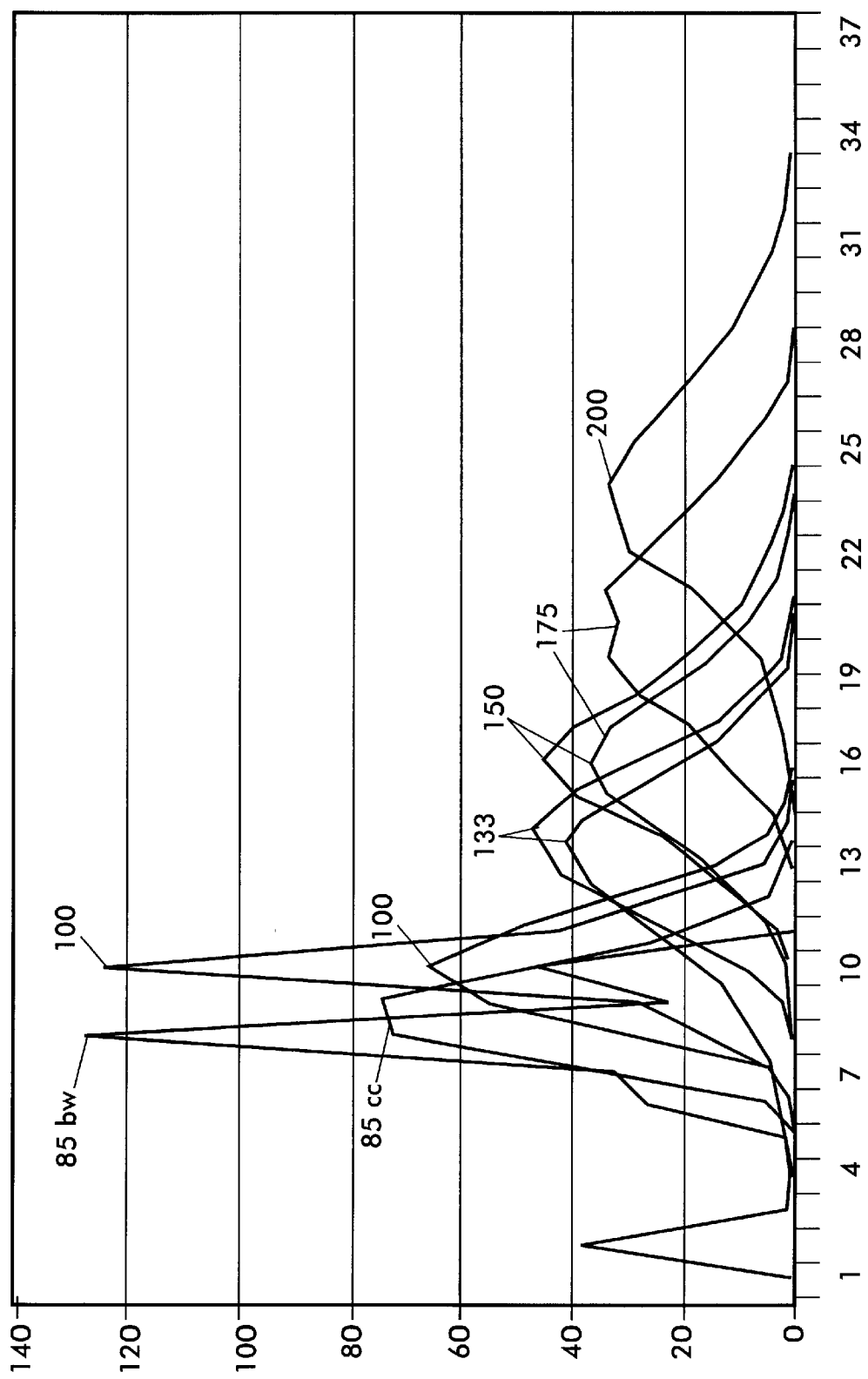
FIG. 3 is a comparison of the results of this method when used on black and color halftones.

FIG. 3 displays the normalized histograms of the MRC measured over a range of halftone frequencies: 85 through 200 DPI. This shows that 85 DPI color halftones look much like 85 DPI black & white halftones when measured with this MRC. This also shows the correlation of absolute MRC with halftone frequency.

Figure 4:
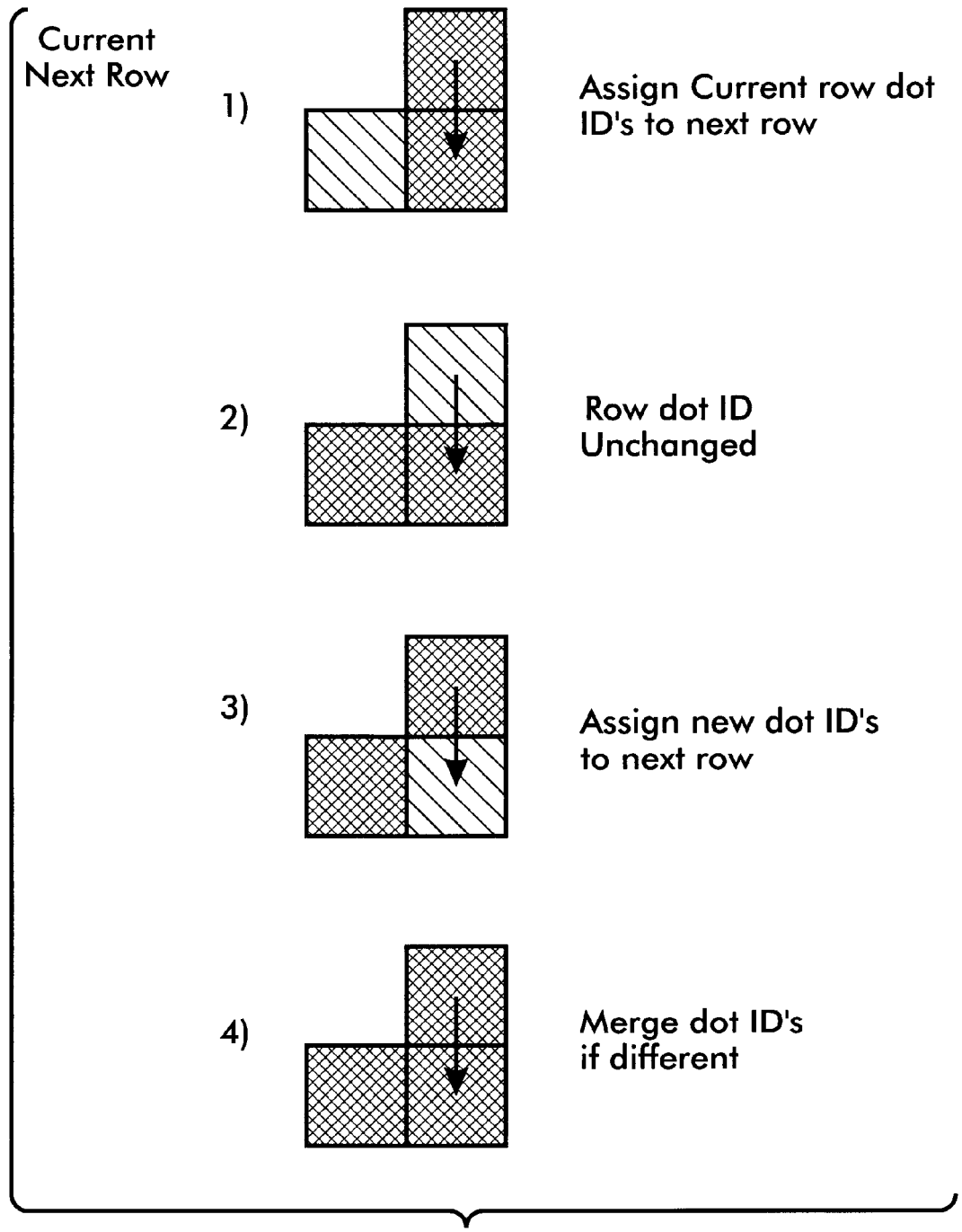
FIG. 4 shows the four types of operations required when processing a column.
Figure 5:
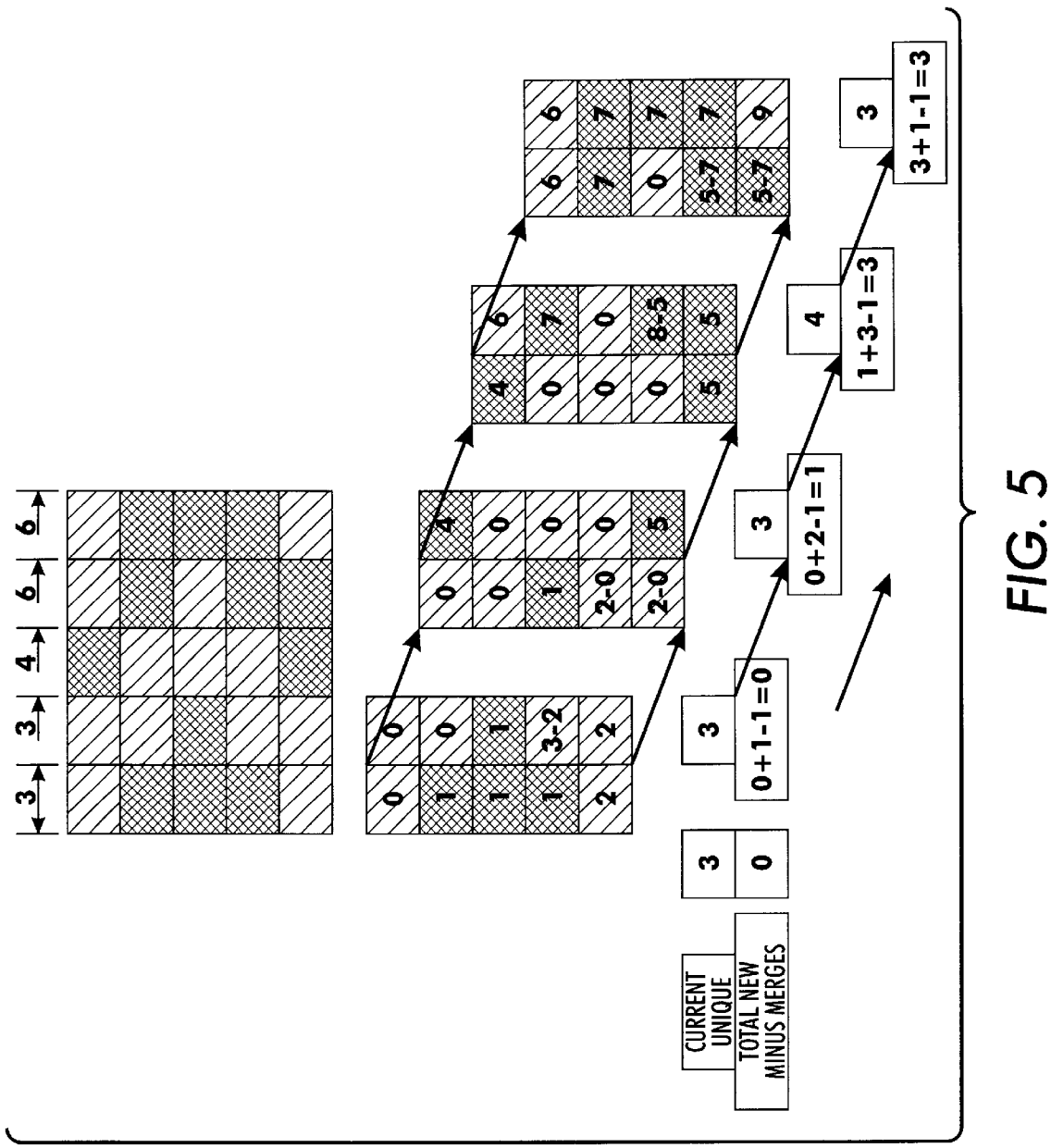
FIG. 5 is an example of the processing of a five by five pixel image.

In order to compute the MRC for a particular output pixel, source pixels in an N×N window surrounding the corresponding source (binary) pixel must be examined. To process each pixel in the input image to produce an MRC output for that same pixel, the process of FIGS. 4 and 5 is used. In the first column, the first pixel is assigned an ID number, here shown as "0". From here the rules of FIG. 4 are applied.

If the next pixel is the same as the one above or to the left it is assigned the same identification number. If the next pixel is not the same type as the one above or to the left, it is assigned a new identification number. If it is the same as the one above and to the left, the two original identifications are merged and one identification is used for all three.

But rather than do this work directly, the algorithm described here works by first processing each N high column in a swath across the image. The results of each vertical operation are saved in temporary storage. A second logical processing operation follows behind and combines the results of the first operation in an N wide window. In practice, this second process will be closely integrated with the first to minimize the required temporary storage. This is the same strategy used with separable filters to reduce the required work. A further enhancement of the algorithm is possible where a larger vertical swath is processed so that multiple horizontal output lines can be computed in the second process. This allows much of the vertical work to also be shared by several outputs for that column.

After reaching the bottom of each column, 2 values are recorded for this column for use by the 2nd process:

Current Unique: The number of unique Ids used in the column.

Total New Minus Merge's: The running total of new states minus merges that have occurred. This is computed by counting how many times a new ID occurred for this column Implementation Notes:

This type of operation, in general can be complex to implement. The key saving grace is that the total number of possible IDs is kept small by restricting the view. Individual region Ids are being monitored only down a single column, rather than across the entire width of the image. Because of this, the total number of ID's can be fixed at N+1. Useful values of N are in the range 10 to 30 which means that direct hardware solutions are possible.

Figure 6:
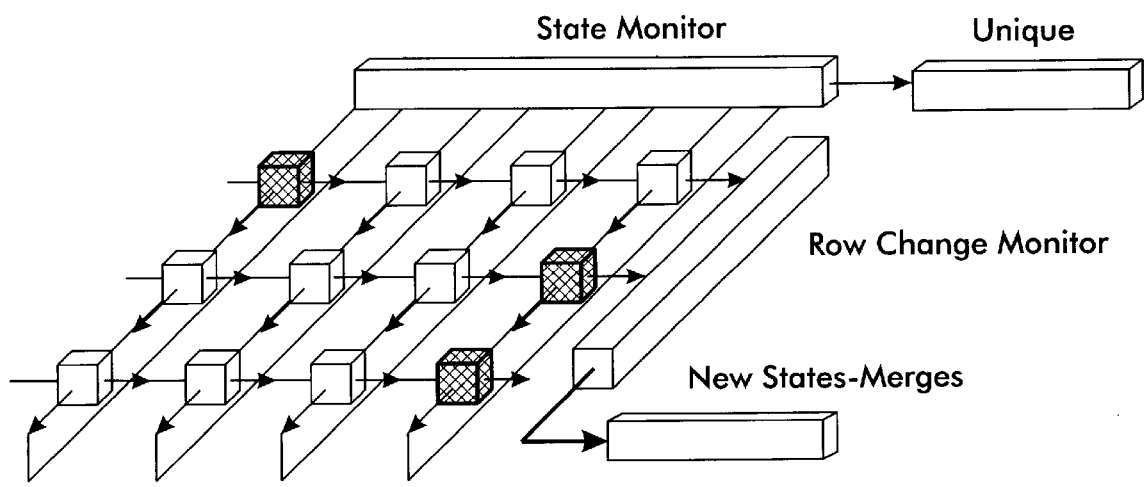
FIG. 6 is an example of a hardware implementation of the invention.
Figure 7:
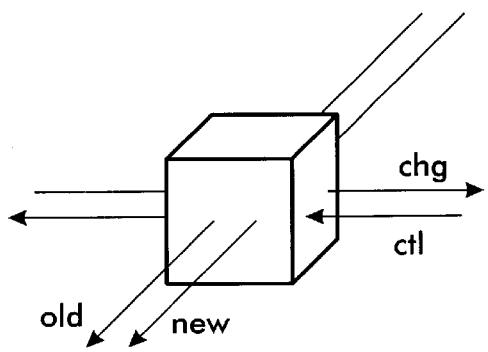
FIG. 7 is a more detailed view of one cell of the circuit of FIG. 6.

FIG. 6 illustrates a possible implementation where each of N rows contains N+1 individual cells. The idea is that the ID for a row is represented by having exactly one of its N+1 cells "on". By using this decoded "one-hot" representation it becomes very easy to tell how many ids are in use by use of "ORing" chains or OR gate trees. FIG. 7 suggests a scheme where two single wire channels pass through each cell (OLD, NEW). Table 1, below, enumerates the simple cell controls which would be required to use such channels to:

Communicate the CurrentUnique state to the State Monitor

Identify which ID should be used for a NEW operation.

Communicate the Old and New Ids to all rows for the MERGE operation,. Counting NEW's and MERGE's can be accomplished by a row change Monitor by whetting row change lines.

TABLE 1

| | Operation | | | | |
|---|---|---|---|---|---|
| Module | NOOP Or Col done | PROP | NEW | MERGE | |
| Selected Row | old <= old 1 state | state <= new | old <= old 1 state state = new chg = true | new state old = old chg = old#new state = new | |
| Selected Row-1 | old <= old 1 state | new <= state | old <= old 1 state | old = state new = new chg = old#new state = new | |
| Other Row | old <= old 1 state | | old <= old 1 state | old = old new = new chg = old == state & old#new state = chg?new:state | |
| State Monitor | old = false count old | | old = false new = first false old | old = old new = new | |
| Row Monitor | | | Add 1 if any chg | Sub 1 if any chg | | and subtracting how many times a merge occurred for the column, then adding this signed number to the Total New Minus Merge value recorded for the previous column. FIG. 5 shows an example in some detail.

The final step is to progress from left to right moving the window one pixel at a time to form a new area, processing the right column, and combining the current values across the desired window width using the formula:

MRC=Current Unique[Left]+Total New Minus Merge [Right]–Total New Minus Merge [Left]

Here Left refers to the column N/2 to the left of the output pixel and Right is the column N/2 to the right. This computation is not identical to the result that would be obtained from strictly restricting the view to an N×N window since it contains information about merges which may have occurred to the left. This is felt to be a feature. In fact extensions are possible which include similar (limited range) merge information for the top/bottom and right.

Temporary register max values:

CurrentUnique: N

Total New Minus Merge: 2*N*N

This register basically can grow forever at a max rate of N/column (or shrink by N−1 over a window). It is only necessary, though to keep enough bits to make sure there is no ambiguity when the subtraction is performed.

Multiple output Rows:

Extending the method so that multiple output rows can be computed in one pass requires adding both more rows and columns of ID cells, keeping additional (partial) rows of the temporary registers as well as being able to examine subsets of the row cells for the various counting and state monitoring While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of estimating the texture frequency in terms of dots per unit area in a band of an image where connected pixels of the same type are assigned the same identification comprising the steps of:

processing each column by iteratively examining each pixel as follows:
- a) if the current pixel is the same type as the previous pixel in the same column, it is assigned the same identification,
- b) if the current pixel is the same as the pixel in the same row of the previous column, it is assigned the same identification,
- c) if the current pixel is different from the previous pixel in the same column and the pixel in the same row of the previous column, it is assigned a new identification, and
- d) if the current pixel is the same as the previous pixel in the same column and the pixel in the same row of the previous column, the two identifications are merged so that they will both have the same identification, at the end of each column, determining the number of unique identifications there are in the column, and the number of identifications there are in use in the entire band, and determining a value which is a function of the dot frequency within each area by adding the number of identifications in the first column and the number of unique identifications in use in the band up to the last column, minus the number of identifications that were in use after the processing of the first column.

* * * * *